United States Patent
Venturi

(10) Patent No.: US 10,046,635 B2
(45) Date of Patent: Aug. 14, 2018

(54) POWERTRAIN FOR A HYBRID TYPE VEHICLE

(71) Applicant: IFP Energies Nouvelles, Rueil-Malmaison (FR)

(72) Inventor: Stephane Venturi, Roiffieux (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 189 days.

(21) Appl. No.: 14/032,565

(22) Filed: Sep. 20, 2013

(65) Prior Publication Data
US 2014/0083246 A1  Mar. 27, 2014

(30) Foreign Application Priority Data
Sep. 26, 2012 (FR) .................... 12 02555

(51) Int. Cl.
*B60K 6/36* (2007.10)
*B60K 6/442* (2007.10)
*B60K 6/383* (2007.10)
*B60K 6/48* (2007.10)

(52) U.S. Cl.
CPC ............ *B60K 6/36* (2013.01); *B60K 6/383* (2013.01); *B60K 6/442* (2013.01); *B60K 2006/4808* (2013.01); *B60K 2006/4825* (2013.01); *B60Y 2400/421* (2013.01); *Y02T 10/626* (2013.01); *Y02T 10/6234* (2013.01); *Y02T 10/6252* (2013.01); *Y10S 903/902* (2013.01); *Y10T 74/19014* (2015.01)

(58) Field of Classification Search
CPC ...................................................... B60K 6/442
See application file for complete search history.

(56) References Cited

U.S. PATENT DOCUMENTS 6,740,002 B1 * 5/2004 Stridsberg .............. B60K 6/387
                                                                   475/5
2001/0042647 A1 * 11/2001 Sakamoto et al. ........... 180/65.2

FOREIGN PATENT DOCUMENTS

| EP | 1122109 A3 | 4/2002 |
| EP | 1236603 A2 | 9/2002 |
| FR | 2811395 A1 | 1/2002 |
| WO | 99/21263 A2 | 4/1999 |

* cited by examiner

*Primary Examiner* — Terence Boes
(74) *Attorney, Agent, or Firm* — Fitch, Even, Tabin & Flannery, LLP

(57) ABSTRACT

The present invention relates to a powertrain for a hybrid type vehicle with a thermal engine (10), notably of internal-combustion type, an electric machine (12) connected to an axle shaft (24) of the vehicle and a transmission device (36) comprising a primary transmission shaft (38) connected to drive shaft (18) of thermal engine (10) through a disengageable coupling (44) and carrying at least two first gear wheels (56, 58) cooperating with at least two second gear wheels (60, 62) carried by a secondary transmission shaft (40) connected to the axle shaft.

According to the invention, primary transmission shaft (36) is connected to an auxiliary electric machine (14).

18 Claims, 2 Drawing Sheets

POWERTRAIN FOR A HYBRID TYPE VEHICLE

FIELD OF THE INVENTION

The present invention relates to a powertrain for driving a hybrid type vehicle.

As it is already known, this type of vehicle is powered both by a thermal engine, generally of internal-combustion type, and by at least one rotary electric machine connected to an electric source, such as one or more electric accumulators.

This combination affords the advantage of optimizing the performances of this vehicle, notably by decreasing the fuel consumption of the thermal engine while preserving the environment through limited pollutant emissions to the atmosphere.

BACKGROUND OF THE INVENTION

In the example described in document FR-2,811,395, this type of vehicle comprises a gearbox with a motive primary line arranged substantially parallel to a receiving secondary line that controls the drive wheels of this vehicle. The primary line consists, on the one hand, of a principal driving shaft driven in rotation by the thermal engine through a disengageable coupling and, on the other hand, of a tubular auxiliary driving shaft driven in rotation by the electric motor and surrounding the principal driving shaft. The principal driving shaft and the auxiliary driving shaft can be rotatingly connected to one another by a claw. Each one of these shafts fixedly carries two gear wheels in mesh with receiving gear wheels carried by the receiving secondary line and mounted rotatingly loose on this line. This line also carries alternate-clearance sliding gears allowing the receiving gear wheels to be rotatingly secured to this secondary line.

Thus, during operation, the vehicle is powered at different speeds either by the electric motor or by the thermal engine, or by both. This is achieved by acting upon the various couplings (disengageable coupling and/or claw and/or sliding gears) carried by the various lines in order to secure the principal driving shaft with the thermal engine and/or this principal driving shaft with the auxiliary driving shaft and/or one of the receiving gear wheels with the receiving secondary line.

Although this transmission device is satisfactory, it however involves quite significant drawbacks.

Indeed, when only the electric motor is used for powering the vehicle, coupling the receiving wheel with the secondary line is necessary so as to transmit the rotating motion of this electric motor to this secondary line. This therefore requires a complication of this device to fulfil a basic function.

Furthermore, the vehicle must comprise a multiplicity of actuators for controlling the disengageable coupling, the claw and the sliding gears. These actuators increase the production cost of the device and can lead to failure and/or dysfunction.

Besides, these actuators must be controlled by a processing unit such as the calculator the engine is usually equipped with, which requires increasing the capacity of this calculator.

Finally, it is necessary, in order to obtain the desired speed, to couple or to uncouple some elements of the device, such as the receiving gear wheels. This increases the time required for shifting gears while causing driving discomfort.

In order to overcome these drawbacks, as better described in document FR-2,962,379, the applicant has developed a powertrain for driving a hybrid type vehicle comprising a gearbox with a motive primary line arranged substantially parallel to a receiving secondary line that controls the drive wheels of this vehicle. The primary line consists of a driving shaft driven in rotation by the thermal engine through a disengageable coupling. The driving shaft fixedly carries two gear wheels in mesh with receiving gear wheels carried by the receiving secondary line and mounted rotatingly loose on this line with one of these wheels carried by the secondary line through a one-way coupling.

The applicant has continued improving this powertrain by combining the simplicity of a gearbox and the ease of use thereof with a longer vehicle running time in electric drive mode.

SUMMARY OF THE INVENTION

The invention therefore relates to a powertrain for a hybrid type vehicle with a thermal engine, notably of internal-combustion type, an electric machine connected to an axle shaft of the vehicle and a transmission device comprising a primary transmission shaft connected to the drive shaft of the thermal engine through a disengageable coupling and carrying at least two first gear wheels cooperating with at least two second gear wheels carried by a secondary transmission shaft connected to the axle shaft, characterized in that the primary transmission shaft is connected to an auxiliary electric machine.

The secondary transmission shaft can comprise two half shafts connected to each other by a one-way coupling.

One of the secondary half shafts can comprise two parts connected to each other by a direct coupling.

Advantageously, the direct coupling can comprise a claw.

The direct coupling can comprise a manual control means.

The shaft driving the thermal engine can comprise two half shafts connected to each other by a one-way coupling.

One of the drive half shafts can carry the auxiliary electric motor.

The one-way coupling can comprise a free wheel.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
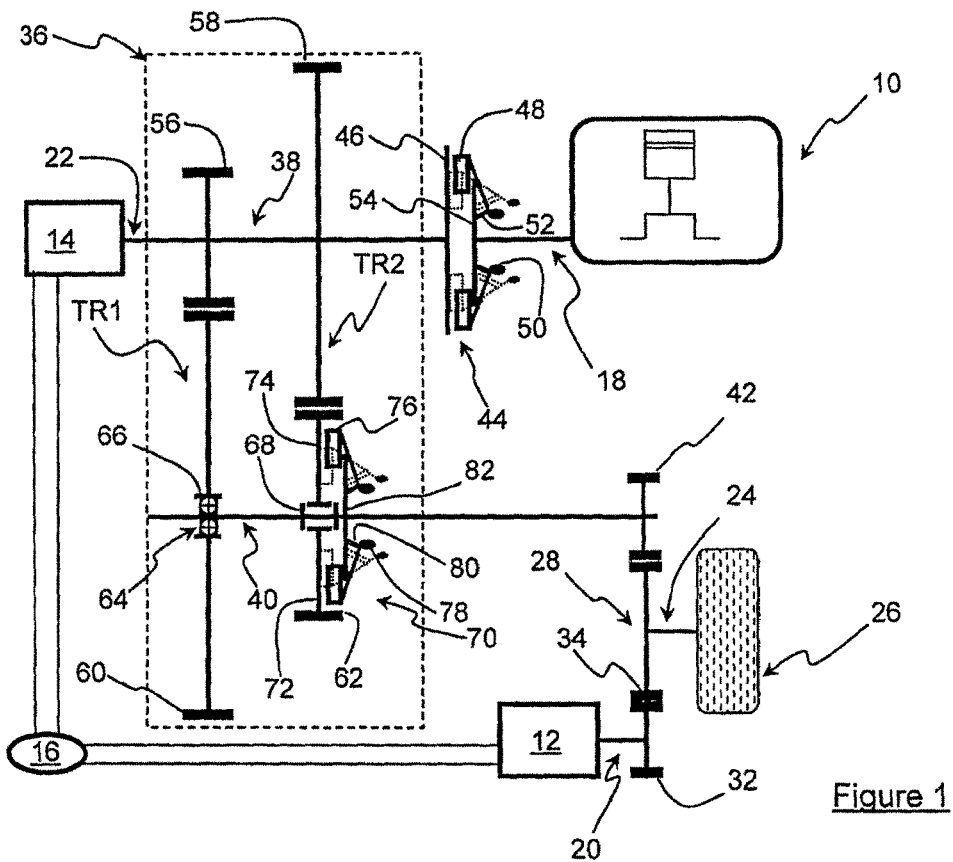
FIG. 1 is a diagram showing a powertrain for driving a hybrid type vehicle according to the invention.

As illustrated in FIG. 1, the powertrain driving the hybrid vehicle comprises a thermal engine 10, notably an internal-combustion engine, and two electric machines, a main electric machine 12 and an auxiliary electric machine 14 that can both operate in electric motor mode or in energy generator mode by being connected to electric accumulators 16 (or batteries).

Thermal engine 10 comprises a drive shaft 18 forming an extension of the crankshaft and controlled in rotation by this engine. Electric machines 12, 14 comprise each a drive shaft 20, 22 consisting of the rotor of these machines.

This system also includes an axle shaft 24 that drives wheels 26 of the vehicle, directly or through the agency of a differential bridge.

This axle shaft is connected through a motion transmission multiplying path 28 to rotor 20 of main electric machine 12. By way of example, this path comprises a gear train with a gear wheel 32 fixedly carried by rotor 20 that meshes with another gear wheel 34 of a different diameter mounted on axle shaft 24.

Of course, this transmission path can comprise any other elements providing transmission of the rotating motion between the rotor and the axle shaft, such as pulleys connected by a belt.

This system also comprises a speed transmission device 36, referred to in the description hereafter as gearbox, which is arranged between shaft 18 of the internal-combustion engine and axle shaft 24.

This gearbox comprises a primary shaft 38 forming an extension of drive shaft 18 and a secondary shaft 40 arranged substantially parallel to the primary shaft and rotatingly secured to axle shaft 24 through a transmission path. This path comprises a gear train consisting of a fixed wheel 42 carried by secondary shaft 42 that meshes with gear wheel 34 of axle shaft 24.

Of course, this transmission path can comprise any other element providing rotating motion transmission between secondary shaft 40 and the axle shaft, such as pulleys and a belt.

As can be better seen in FIG. 1, primary shaft 38 is connected to shaft 18 of engine 10 through a disengageable coupling 44.

By way of example, this coupling is a centrifugal clutch whose reaction plate 46 is fixedly carried by one end of the primary shaft and whose friction plate 48, controlled in axial displacement by weights 50 and return springs 52, is carried by a plate 54 fixedly connected to the free end of engine shaft 18. Thus, under the impulse of the rotation of this engine shaft, friction plate 48 is moved in axial translation under the effect of the centrifugal motion of the weights and connected to reaction plate 46 through contact therewith.

The primary shaft fixedly carries in translation and in rotation at least two gear wheels of different diameters, here a gear wheel of small diameter 56 arranged in the vicinity of the free end of the primary shaft, and a gear wheel 58 of larger diameter than wheel 56, arranged beside the reaction plate. For simplification reasons, in the rest of the description, these gear wheels are referred to as first gear wheels.

These first gear wheels mesh with gear wheels of different diameters carried by secondary shaft 40 rotatingly secured to axle shaft 24.

Thus, a large-diameter gear wheel 60 cooperates with small gear wheel 56 and a small-diameter gear wheel 62 meshes with first large gear wheel 58. Similarly, for simplification reasons, these gear wheels 60 and 62 are referred to as second gear wheels.

Two gear trains are formed, a first one TR1 with gear wheels 56, 60, and a second one TR2 with gear wheels 58, 62, each one of these trains having different gear ratios R1, R2.

Second large-diameter gear wheel 60 is arranged on secondary shaft 40 by interposing thereon a one-way coupling, such as a free wheel 64, between bearing 66 of this gear wheel and this shaft.

Second small-diameter gear wheel 62 is mounted rotatingly idle on shaft 40 and immobilized in axial translation by fixed stops 68.

This gear wheel can be rotatingly secured to this shaft by means of a disengageable coupling 70.

By way of example, this coupling is a centrifugal clutch similar to the one arranged between engine shaft 18 and primary shaft 38 of gear box 36.

Thus, this coupling comprises a linking surface 72 made up of part of the shell 74 of gear wheel 62 and a friction plate 76 opposite this linking surface. This friction plate is controlled in axial displacement by a set of weights 78 and of springs 80 carried by a plate 82 fixedly connected to secondary shaft 40. Thus, during rotation of shaft 40 and under the effect of the centrifugal motion of the weights, the friction plate is shifted in axial translation in the direction of shell 74 until it comes into contact with surface 72. This therefore allows to establish a rotational link between shaft 40 and gear wheel 62.

As can be better seen in FIG. 1, this powertrain also comprises a layout where auxiliary electric machine 14 is connected to primary shaft 38 by being arranged at the shaft end so that rotor 22 of this machine is rotatingly secured to this primary shaft.

The various operating configurations are now described.

In a first stage, the electric mode of powering the hybrid vehicle is mentioned, wherein only main electric machine 12 is used as the engine driving the vehicle.

In this mode, and with reference to FIG. 1, couplings 44 and 70 are in disengaged position, motor 14 is not electrically supplied and main electric motor 12 is fed by batteries 16, thus generating rotation of rotor 20.

This rotor transmits its rotating motion to axle shaft 24 through gear wheels 32, 34, and to secondary shaft 40 through gear wheels 32, 34 and 42.

The rotation of the axle shaft is transmitted, directly or indirectly, to wheels 26 of the vehicle so as to drive this vehicle into motion.

Simultaneously, the rotation of secondary shaft 40 drives into rotation centrifugal clutch 70 that remains in disengaged position, until a threshold rotating speed Nr of this shaft beyond which clutch 70 is active, is reached. Thus, gear wheel 62 remains idle in rotation on this shaft without driving large first gear wheel 58.

This applies when the electric motor is actuated with a first direction of rotation of rotor 20 for driving the vehicle in forward gear.

In this configuration, gear wheel 60 is not driven into rotation by free wheel 64, which is in this case in the sliding direction. Thus, all the gear wheels are stopped.

For the reverse gear, rotor 20 of main electric motor 12 is controlled in rotation in an opposite direction with a rotating speed that is lower than threshold value Nr, and couplings 44 and 70 remain in disengaged position.

Second large-diameter gear wheel 60 is then driven into rotation by free wheel 64 that transmits the rotating motion of secondary shaft 40 thereto. This rotating motion is transmitted to primary shaft 38 through meshing of gear wheel 60 with small gear wheel 56. The rotation of shaft 38 then causes rotation of rotor 22 of auxiliary electric machine 14 that can fulfil the function of a current generator for recharging batteries 16. This rotation of shaft 38 also drives into rotation large gear wheel 58 that meshes with gear wheel 62 mounted idle in rotation on shaft 36.

Furthermore, considering the disengaged position of centrifugal clutch 44, the rotation of primary shaft 38 is not retransmitted to shaft 18 driving the internal-combustion engine.

As regards the configuration where the vehicle is driven in forward gear with rotor 20 rotating in the first direction of rotation, as soon as the rotating speed of secondary shaft 40 exceeds threshold value Nr, centrifugal clutch 70 is operative by connecting in rotation secondary shaft 40 to small-diameter gear wheel 62.

In this configuration, gear wheel 62 meshes with large gear wheel 58 that drives primary shaft 38 into rotation.

The rotation of this shaft is then transmitted to gear wheel 56 that meshes with large gear wheel 60 and to rotor 22 of auxiliary electric machine 14 that can be used in this configuration as a current generator for recharging batteries 16.

Considering the rotating speed differential between secondary shaft 40 and gear wheel 60 due to the different ratios R1 and R2 between gear trains TR1 and TR2, and to the presence of free wheel 64, shaft 40 is not driven into rotation by wheel 60. This is due to the fact that the rotating speed of secondary shaft 40 is higher than the rotating speed of large gear wheel 60.

It is thus possible to drive the vehicle into motion, either in forward gear over the entire range of use of the electric motor, or in reverse gear over a range of use of this motor from a rotating speed above 0 to a rotating speed of secondary shaft 40 below threshold value Nr, while enabling auxiliary electric machine 14 to be used as a generator for recharging the batteries and the range of the hybrid vehicle to be extended.

Furthermore, during vehicle deceleration and/or braking phases, recovery of the electric energy is maximized. Electric machine 12 is also used as a current generator for recharging batteries 18.

In another electric mode configuration, the two electric machines 12 and 14 are used as electric motors for powering the vehicle.

In this mode, couplings 44 and 70 are in disengaged position and motors 12 and 14 are electrically supplied by batteries 16 by generating rotation of rotors 20 and 22.

As described above, motor 12 allows to drive simultaneously wheels 26 of the vehicle and secondary shaft 40 with centrifugal clutch 70 that remains in disengaged position up to a threshold rotating speed Nr.

Auxiliary motor 14 drives into rotation wheels 56 and 58 carried by primary shaft 38. The rotation of these wheels is then transmitted to wheels 60 and 62.

Since wheel 60 is carried by shaft 40 through free wheel 64 and considering the rotating speed differential between secondary shaft 40 and gear wheel 60, the free wheel is in the blocking direction. Shaft 40 is then driven into rotation by wheel 60 up to threshold rotating speed Nr.

The vehicle is thus powered by the two electric motors, by motor 12 through its rotor 20 and by motor 14 through the transmission path comprising rotor 22, gear train TR1 and secondary shaft 40.

As soon as the rotating speed of secondary shaft 40 exceeds threshold value Nr, centrifugal clutch 70 is operative by connecting in rotation secondary shaft 40 to small-diameter gear wheel 62.

Thus, gear wheel 62 meshes with large gear wheel 58 and gear wheel 56 meshes with gear wheel 60.

Considering the rotating speed differential between secondary shaft 40 and gear wheel 60, and the presence of free wheel 64, shaft 40 is no longer rotatingly secured to wheel 60.

The rotation of rotor 22 of electric motor 14 is thus transmitted to secondary shaft 40 through gear wheel 58 and gear wheel 62 that is secured to shaft 40 through clutch 70.

The vehicle is thus powered by motor 12 through its rotor 20 and by motor 14 by means of the transmission path comprising rotor 22, gear train TR2 and secondary shaft 40.

This notably allows the vehicle driveability to be improved while limiting the power of electric machines 12 and 14.

In the thermal mode of powering the hybrid vehicle that is described now, internal-combustion engine 10 is operating and it is used as the engine driving the vehicle.

In the rest state, none of the two centrifugal clutches 44 and 70 is operative and shaft 18 is rotating.

As soon as rotating speed Nv of engine shaft 18 reaches a threshold value, centrifugal clutch 44 is operative by connecting kinematically shaft 18 to primary shaft 38 of gear box 36.

Gear wheels 56 and 58 are then driven into rotation at the same speed as shaft 18.

Small gear wheel 56 thus meshes with gear wheel 60 which drives into rotation, through free wheel 64, secondary shaft 40 and axle shaft 24 through gear wheels 42 and 34, as well as rotor 20 of main electric machine 12 through gear wheels 42, 34 and 32.

Large gear wheel 58 cooperates in mesh with small-diameter gear wheel 62.

If the speed of secondary shaft 40, driven into rotation by gear train TR1, is lower than aforementioned speed Nr, centrifugal clutch 70 remains in disengaged position. Thus, small-diameter gear wheel 62 remains idle on shaft 40 and the rotation through meshing with large gear wheel 58 has no effect on this shaft.

In this configuration, rotor 20 of main electric machine 12 is driven into rotation by gear wheels 42, 34 and 32 while rotor 22 of auxiliary electric machine 14 is driven into rotation by primary shaft 38.

Thus, both electric machines can be used as generators for recharging batteries 16 or as electric motors assisting the thermal engine.

As soon as the rotating speed of shaft 40 exceeds threshold value Nr, centrifugal clutch 70 is active by connecting gear wheel 62 to this shaft.

Secondary shaft 40 and axle shaft 24 are therefore driven at a different rotating speed by gear train TR2.

Indeed, gear train TR1 of gear wheels 56 and 60 has no action on shaft 40 because, considering the rotating speed differential between gear wheel 60 and second shaft 40 driven by gear wheel 62, and the presence of free wheel 64, shaft 40 is not driven into rotation by gear wheel 60. The reason is that the rotating speed of the secondary shaft is higher than the speed of large gear wheel 60.

In this other configuration, the vehicle is thus driven into motion according to a second gear ratio provided by the gear train of gear wheels 58, 62.

As mentioned above, both electric machines can be used as generators for recharging batteries 16 since rotor 20 of main electric machine 12 is driven into rotation by gear wheels 42, 34 and 32, and rotor 22 of auxiliary electric machine 14 is driven into rotation by primary shaft 38.

Similarly, these electric machines can be used to recover energy, totally or partly, either during vehicle deceleration phases or during a braking phase, using these machines as generators for the batteries.

It can be noted that, in the thermal drive mode, it is possible to combine the use of the thermal engine with that of one of the electric machines or both, the powers accumulating so as to drive the vehicle.

Figure 2:
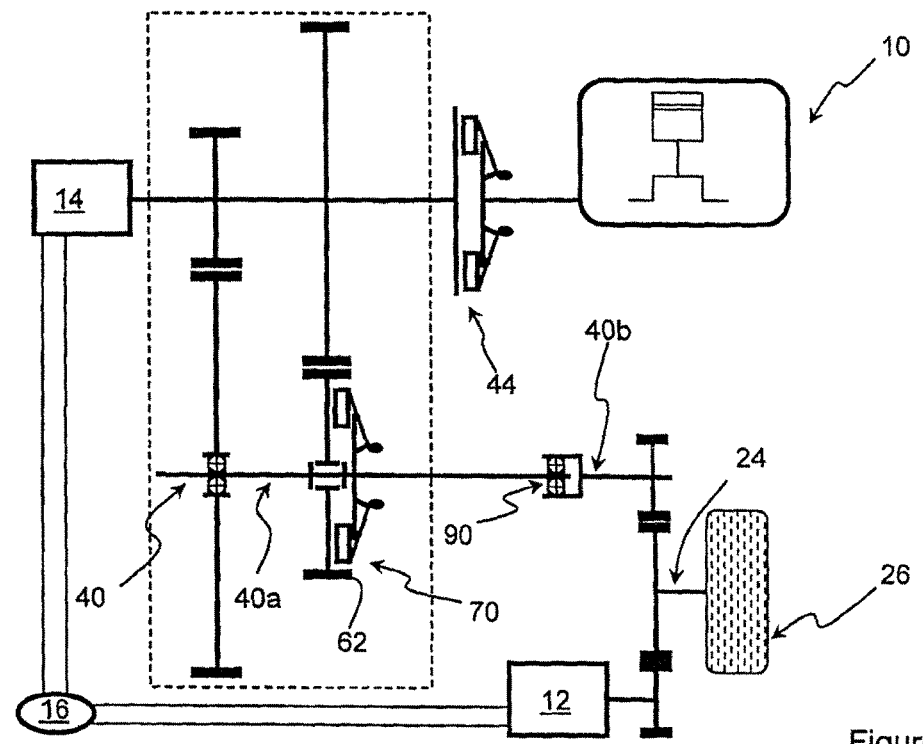
FIG. 2 shows a variant of this powertrain.

The variant of FIG. 2 differs from FIG. 1 in that the secondary shaft comprises two half shafts 40a and 40b coaxial to one another and connected by a one-way coupling such as a free wheel 90.

This free wheel is advantageously arranged between gear wheel 62 and centrifugal clutch 70.

In the electric mode configuration where the hybrid vehicle is driven in forward gear, only main electric machine 12 is used as the motor powering the vehicle.

In this mode, main electric motor 12 is electrically supplied by batteries 16 by generating rotation of rotor 20 in a first direction of rotation. This rotation causes rotation of axle shaft 24 through gear wheels 32 and 34, and rotation of half shaft 40b through gear wheels 32, 34 and 42.

In this configuration, the other half shaft 40a is not driven into rotation by free wheel 90, which is in this case in the sliding direction.

Axle shaft 24 can thus be driven over the entire range of operation of electric motor 12 and half shaft 40b can exceed threshold speed Nr without any repercussion on the actuation of centrifugal clutch 70.

Furthermore, main electric motor 12 only drives a limited number of parts and the power thus available can be used for powering the vehicle.

In another operating mode, both electric machines can be used for powering the vehicle, alone or in combination with the thermal engine as described above.

As in the example of FIG. 1, rotor 20 of main electric motor 12 is driven into rotation in an opposite direction, for the reverse gear, with a rotating speed below threshold value Nr. In this case, free wheel 90 is in the blocking direction and the two half shafts 40a and 40b are rotatingly connected to one another. Reverse gear operation is therefore identical to that of FIG. 1.

For the thermal mode of powering the hybrid vehicle, internal-combustion engine 10 is operating and it is used as the engine driving the vehicle with the operating mode described in connection with FIG. 1.

This is due to the fact that, considering the speed differential between half shafts 40a and 40b, free wheel 90 is in the blocking direction by transmitting the rotation of half shaft 40a to half shaft 40b.

Similarly, only electric machine 12 can be used to recover energy, totally or partly, either during vehicle deceleration phases or during a braking phase, using this machine as a generator for the batteries.

Furthermore, in a vehicle deceleration phase and whatever the gear ratio of gear box 36, the thermal engine is disconnected from the axle through opening of clutch 44, which allows energy recovery to be maximized.

Figure 3:
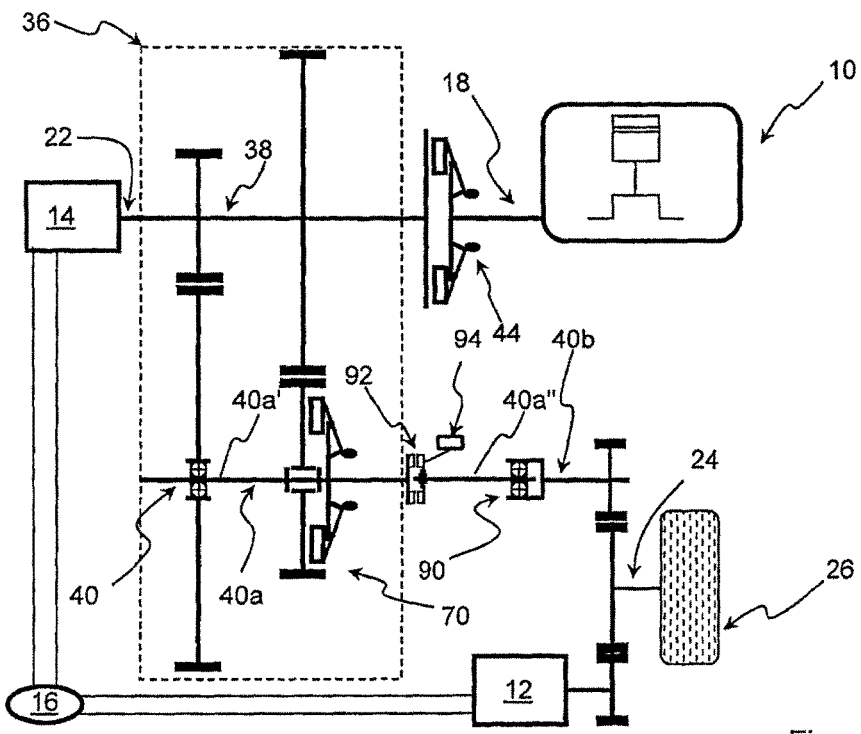
FIG. 3 illustrates another variant of the powertrain of FIG. 2.

In the case of FIG. 3, which is a variant from FIG. 2, half shaft 40a is separated into two parts 40a' and 40a", and these two parts are connected by means of a direct coupling of claw type 92, preferably with manual control 94. As can be better seen in the figure, this claw is advantageously arranged between free wheel 90 and centrifugal clutch 70.

The variant of FIG. 3 operates in the same manner as in FIG. 2 when claw 92 is in active position.

This variant differs from that of FIG. 2 in that it allows to switch to a "backup" mode when the batteries are empty since it enables them to be recharged 16 by means of thermal engine 10 when the vehicle is stationary.

This is achieved by deactivating claw 92, which prevents any rotating motion transmission from shaft 40a' to shaft 40a", and consequently to wheels 26.

When the vehicle is stationary, the thermal engine is started and when clutch 44 is operative from the rotating speed Nv of shaft 38, the latter is driven into rotation by shaft 18 of the thermal engine. This rotation is then transmitted to rotor 22 of electric machine 14. This machine then acts as an electric generator supplying batteries 16.

This variant also enables a "series hybrid" type operation mode for powering the vehicle.

More precisely, as mentioned above, thermal engine 10 drives machine 14 that is used as a generator. The electric power thus produced is sent to electric machine 12 that thus powers the vehicle.

Figure 4:
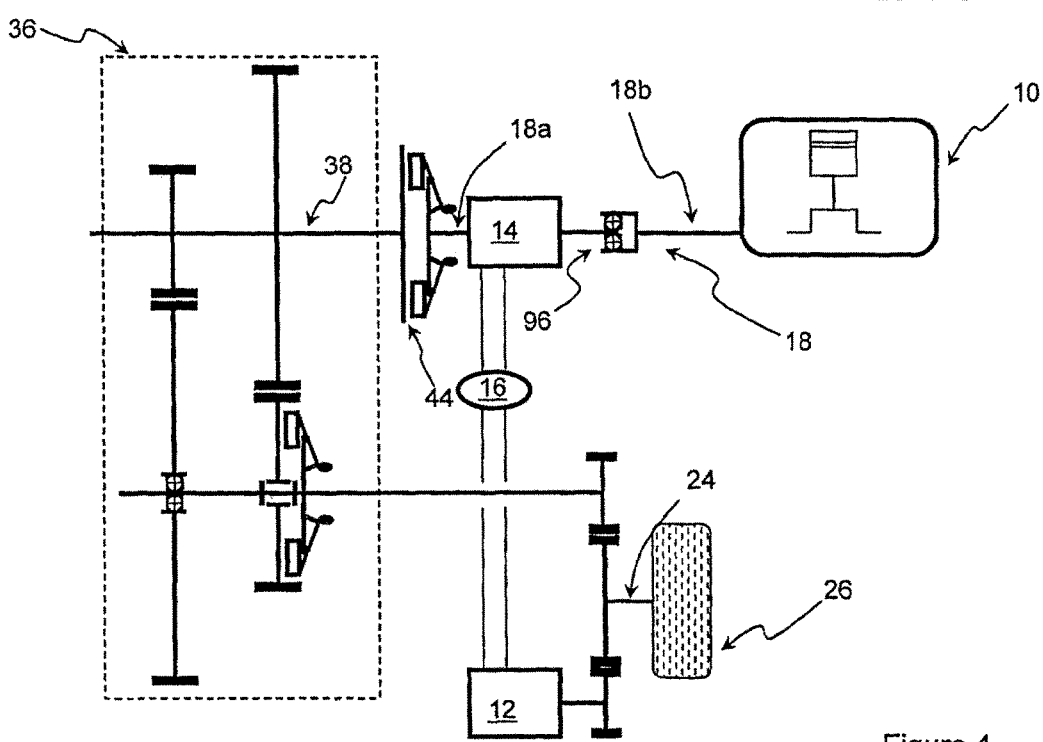
FIG. 4 is also a variant of FIG. 1.

The variant of FIG. 4 is different in that drive shaft 18 of engine 10 comprises two half shafts 18a and 18b connected to one another by a one-way coupling such as a free wheel 96.

As can be better seen in this figure, free wheel 96 is arranged between thermal engine 10 and centrifugal clutch 44, and auxiliary electric motor 14 is advantageously arranged between this clutch and free wheel 96 with its rotor that merges with half shaft 18a.

As for the electric mode of powering the hybrid vehicle in this variant with main electric machine 12 used as the motor driving the vehicle in forward or reverse gear, the operation is identical to that in FIG. 1.

In operation with the two electrically supplied electric motors, electric motor 14 can be operative for driving the vehicle only when the speed of shaft 18a exceeds threshold value Nv. Once this speed is reached, centrifugal clutch 44 is operative and shaft 18a is connected to shaft 380.

In this configuration, the rotation of shaft 18a is not transmitted to shaft 18b due to the presence of free wheel 96 in the sliding direction.

After starting the thermal engine, the free wheel is in the blocking direction as soon as the rotating speed of shaft 18a is above that of shaft 18b.

From this configuration, the operation is similar to that already described in connection with FIG. 1.

The present invention is not limited to the embodiment described and it encompasses any equivalent or variant covered by the invention.

The invention claimed is:

1. A powertrain for a hybrid vehicle, comprising a thermal engine having a drive shaft, an electric machine connected to an axle shaft of the vehicle, a transmission device comprising a primary transmission shaft connected to the drive shaft of thermal engine through a disengageable coupling and carrying at least two first gear wheels cooperating with at least two second gear wheels carried by a secondary transmission shaft connected to the axle shaft, wherein the at least two second gear wheels comprise a second large diameter gear wheel arranged on the secondary transmission shaft by interposing a one way coupling and a second small diameter gear wheel mounted rotatingly idle on the secondary transmission shaft and rotatingly securable to the secondary shaft by a disengageable coupling, and an auxiliary electric machine connected to the primary transmission shaft, wherein the auxiliary electric machine is configured to operate selectively as an electric motor operably connected to an axle shaft of the vehicle for driving an axle shaft of the vehicle, including in an electric mode configuration in which the thermal engine does not drive the axle shaft of the vehicle, and as an energy generator machine for charging a battery of the vehicle.

2. A powertrain as claimed in claim 1, characterized in that the secondary transmission shaft comprises two half shafts connected to each other by a one-way coupling.

3. A powertrain as claimed in claim 2, characterized in that one of the secondary half shafts comprises two parts connected to each other by a direct coupling.

4. A powertrain as claimed in claim 3, characterized in that the direct coupling comprises a claw.

5. A powertrain as claimed in claim 3, characterized in that the direct coupling comprises a manual control means.

6. A powertrain as claimed in claim 1, characterized in that the drive shaft comprises two half shafts connected to each other by a one-way coupling.

7. A powertrain as claimed in claim 6, characterized in that one of the drive half shafts carries the auxiliary electric motor.

8. A powertrain as claimed in claim 2, characterized in that the one-way coupling comprises a free wheel.

9. A powertrain as claimed in claim 6, characterized in that the one-way coupling comprises a free wheel.

10. A powertrain as claimed in claim 4, characterized in that the direct coupling comprises a manual control means.

11. A powertrain for a hybrid vehicle, comprising a thermal engine having a drive shaft, an electric machine connected to an axle shaft of the vehicle, a transmission device comprising a primary transmission shaft connected to the drive shaft of thermal engine through a disengageable coupling and cooperating with a secondary transmission shaft connected to the axle shaft, a second large diameter gear wheel arranged on the secondary transmission shaft by interposing a one way coupling and a second small diameter gear wheel mounted rotatingly idle on the secondary transmission shaft and rotatingly securable to the secondary shaft by a disengageable coupling, and an auxiliary electric machine having a rotor operably connected to the primary transmission shaft, wherein the auxiliary electric machine is configured to operate selectively as an electric motor operably connected to an axle shaft of the vehicle for driving an axle shaft of the vehicle, including in an electric mode configuration in which the rotor of the auxiliary electric machine is connected to the primary transmission shaft and disengaged from the drive shaft of the thermal engine, and as an energy generator machine for charging a battery of the vehicle.

12. A powertrain as claimed in claim 11, wherein the rotor of the auxiliary machine is rotatingly secured to the primary transmission shaft.

13. A powertrain as claimed in claim 12, wherein, in the electric mode configuration the primary transmission shaft and the rotor of the auxiliary machine rotatingly secured thereto are disengaged from the drive shaft of the thermal engine by disengaging the disengageable coupling.

14. A powertrain as claimed in claim 11, wherein the rotor of the auxiliary machine is operably connected to the drive shaft of the thermal engine by a one way coupling and is operably connected to the primary transmission shaft by the disengageable coupling.

15. A powertrain as claimed in claim 11, wherein the drive shaft comprises a first half shaft connected to the thermal engine and a second half shaft connected to the first half shaft by a one-way coupling, wherein the rotor of the auxiliary machine is connected to the second half shaft.

16. A powertrain as claimed in claim 15, wherein the one-way coupling comprises a free wheel.

17. A powertrain as claimed in claim 11, further comprising a first small diameter gear wheel and a first large diameter gear wheel rotating with the primary transmission shaft, wherein the second large diameter gear wheel cooperates with the first small diameter gear wheel to form a first gear train, and the second small diameter gear wheel cooperates with the first large diameter gear wheel to form a second gear train, the first and second gear trains having different gear ratios.

18. A powertrain as claimed in claim 1, wherein the at least two first gear wheels comprise a first small diameter gear wheel and a first large diameter gear wheel, wherein the second large diameter gear wheel cooperates with the first small diameter gear wheel to form a first gear train, and the second small diameter gear wheel cooperates with the first large diameter gear wheel to form a second gear train, the first and second gear trains having different gear ratios.

* * * * *